INVENTOR.
MICHEL VURPILLOT
BY Bacon & Thomas
ATTORNEYS

Aug. 4, 1964  M. VURPILLOT  3,143,381
FLUID THRUST BEARING
Filed June 2, 1961  2 Sheets-Sheet 2

INVENTOR.
MICHEL VURPILLOT
BY
Bacon & Thomas
ATTORNEYS

3,143,381
FLUID THRUST BEARING
Michel Vurpillot, Paris, France, assignor to Commissariat a l'Energie Atomique, Paris, France
Filed June 2, 1961, Ser. No. 114,458
Claims priority, application France June 13, 1960
6 Claims. (Cl. 308—9)

The present invention relates to thrust bearings of the type known as "fluid" bearings and seeks to provide such a bearing which has good stability properties with compressible fluids even when the difference in pressure is relatively high.

Fluid thrust bearings, in which the thrust applied to the bearing is balanced by the static pressure of a fluid exerted on a surface of a piston, are currently used when the fluid is incompressible. On the other hand, if the fluid is a gas, it is not particularly easy to use a bearing of this type due to the instability which often arises when the difference between the pressure inside the bearing and the ambient pressure is considerable.

An object of the present invention is to remedy these drawbacks.

According to the invention, there is provided a fluid thrust bearing for a revolving shaft, comprising a chamber defined between a piston forming a thrust member of said bearing and integral with said revolving shaft, and a plane surface of a fixed structure supporting a holding member through which the said shaft revolves, and in which an admission device is provided to control the flow of said fluid in order to regulate the static pressure of the fluid which is exerted on the piston in order to balance the axial thrust of the shaft, and a sealing system limiting escape of said fluid in dependence upon the axial position of said revolving shaft.

In the most generally used fluid bearings, the escape section of the bearing generally depends on the axial displacement of the shaft, which allows the pressure of the fluid to be automatically adjusted to the thrust which is to be balanced. In the bearing according to the invention, the control of the flow of the fluid admitted may be combined with that of the escape section or, on the other hand, a constant escape section may be provided. The first arrangement will generally allow the axial displacement of the shaft to be limited in relation to the thrust, and the second will be more easily suited to reduced escape flow and to a considerable displacement of the shaft.

In order that the invention may be more clearly understood, reference will now be made to the accompanying drawings which show three specific embodiments thereof by way of example only and in which.

Figure 1:
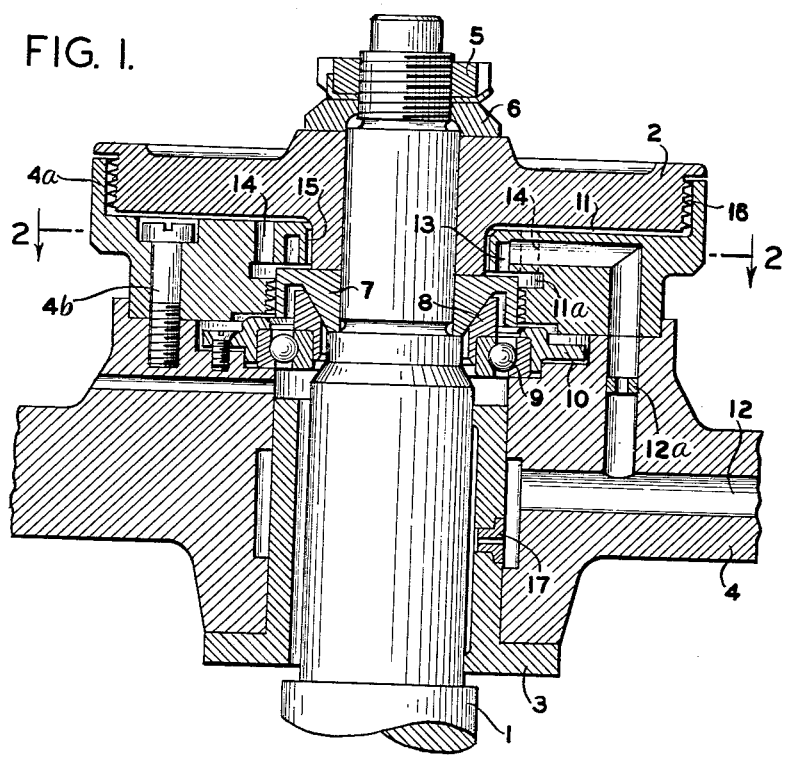
FIG. 1 is a vertical view, partly in cross-section, of a thrust bearing taken on line 1—1 of FIG. 2.
Figure 2:
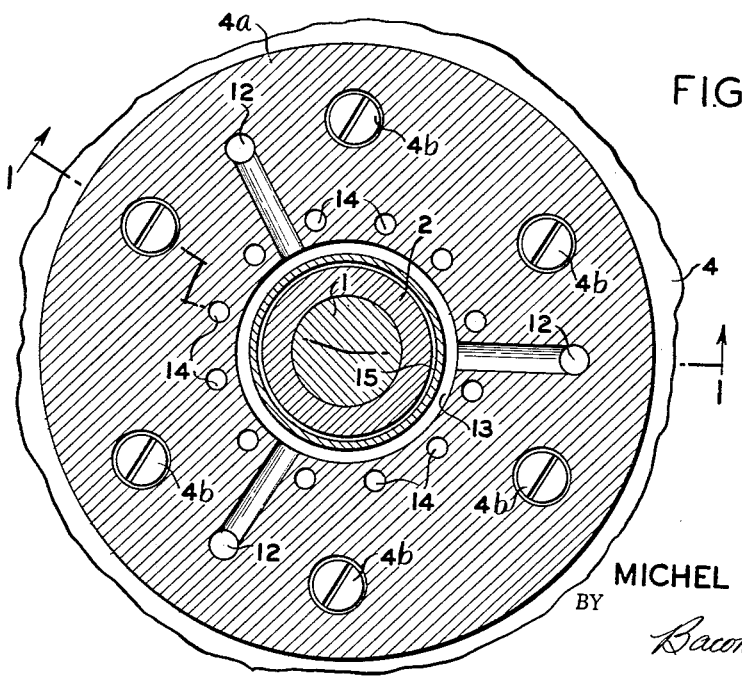
FIG. 2 is a horizontal sectional view of the thrust bearing taken on line 2—2 of FIG. 1.

Referring to the drawings, in FIGURE 1, 1 indicates the shaft of a machine having a fluid thrust bearing, 2 indicates the piston of the thrust bearing, 3 the carrier bearing near the thrust bearing, and 4 and 4a two members of a structure common to the thrust bearing and the carrier bearing. The members 4 and 4a are secured together by means of screws 4b. The piston 2 of the thrust bearing is held in place by means of a nut 5, by way of a ring 6. On the opposite side to the nut 5 piston 2 is supported on a ring-like member 7 which has a conical outer surface.

This ring member 7 is supported by its conical surface on a bushing 8 which has a conical inner surface and is integral with the inner race of a ball bearing 9. This ball bearing 9 is held in the structure 4 by means of an intermediate member 10.

The assembly is constructed so that, even when at rest, the piston 2 does not bear on the plane surface of the portion 4a of the structure juxtaposed thereto, but leaves a free space 11, hereinafter called the "chamber." Into the latter is fed the fluid intended to balance the pressure being exerted elsewhere on the shaft 1. Conduits 12 are provided to this end in the portions 4 and 4a of the structure. They communicate with an annular throat 11a via an annular outlet port or nozzle 13. Said throat is connected to the chamber 11 by pipes 14 suitably distributed about the shaft 1 and by way of the play which prevails at 15 between the middle of the piston 2 and the inner wall of the annular nozzle 13. The control of the flow of fluid at the inlet of the throat 11a and therefore into the chamber 11, is effected by means of the outlet port or nozzle 13 which is more or less blocked by the upper surface of ring member 7 depending upon the axial position of the shaft. A throttle diaphragm valve 12a is located beyond the nozzle 13, for example in the conduits 12, for, in certain cases, a predetermined volume must precede the nozzle 13. The fluid escapes from the chamber 11 past the outer cylindrical surface of the piston 2 which is provided with baffles 16 in order to reduce the escape.

The bearing 3 represented here is, by way of example, also a fluid bearing. It is fed by the same conduits 12 and the nozzle 17.

Figure 3:
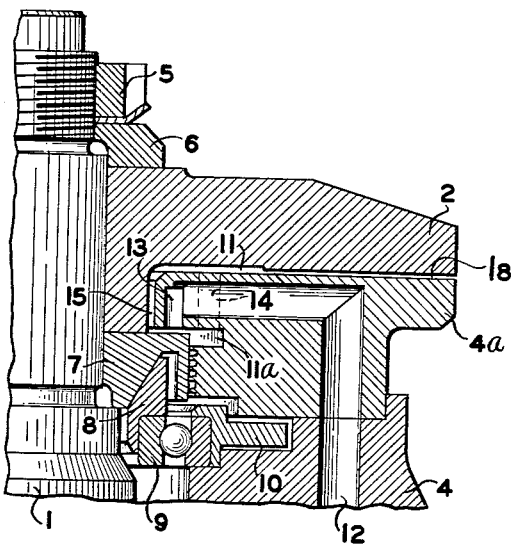
FIG. 3 is an enlarged vertical view, broken away and partly in cross-section, of a modification of the thrust bearing illustrated in FIG. 1.

In FIGURE 3, like references denote like parts as in FIGURE 1. However, the escape from the chamber 11 takes place in this case radially in the space 18 comprised between two plane parallel surfaces; that of the piston 2 and that of the structure 4a which faces it.

Figure 4:
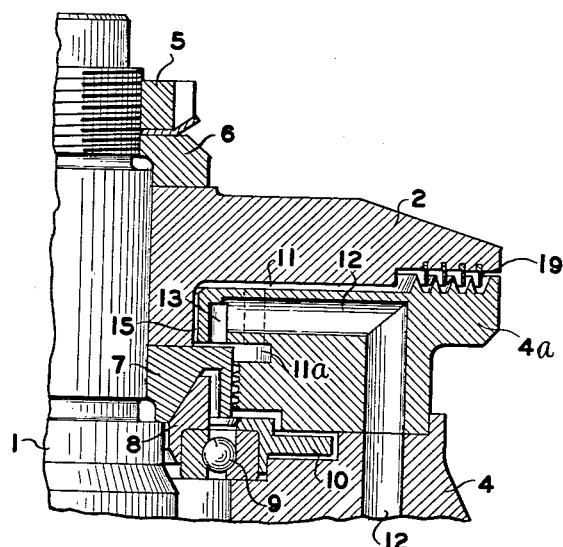
FIG. 4 is an enlarged vertical view, broken away and partly in cross-section, of a further modification of the thrust bearing illustrated in FIG. 1.

In FIGURE 4 the escape from the chamber 11 is also effected radially but via a labyrinth 19.

In FIGURES 3 and 4, the carrier bearing 3 of FIGURE 1 has not been shown.

In the different examples shown, the bearing according to the invention is assumed to be that of a vertically-mounted machine. When functioning, it must withstand a force equal to the resultant of the weight and of any axial thrust on the machine, and, in the arrested position, it must withstand the weight alone. Furthermore the pressure of the fluid feeding the bearing is assumed to be provided by the machine itself. In these conditions, when arrested, and at low speeds, the bearing is not fed and the weight is supported by the ball bearing 9, the conical faces of members 7 and 8 being in contact. When the fluid pressure is sufficient the shaft 1 is raised. The ring 7 leaves the bush 8 which puts the ball bearing 9 out of action. The axial displacement of the shaft continues until the upper surface of ring member 7 is close enough to the outlet port or nozzle 13 to produce a throttling effect at the output thereof, so that the pressure in the chamber 11 assumes exactly that value required by the axial force which the thrust bearing must withstand. The escape at 16 depends only upon the pressure prevailing in the chamber 11, for the escape section is independent of the axial position of the shaft.

In the case in which the bearing feed pressure is provided by an external source independent of the operation of the machine, the ball bearing 9 may be eliminated.

In the bearings shown in FIGURES 3 and 4, the escape section depends on the axial position: it increases when the shaft rises whilst the admission section in the chamber 11 decreases. It may be seen in these conditions that the pressure required in the chamber 11 is obtained after smaller axial displacements than in the case of the bearing in FIGURE 1. On the other hand the useful surface of the piston 2 is smaller so that it is necessary to increase the diameter of the piston. It is for this reason and also as a result of the possibility of increasing the number of the baffles in the arrangement according to FIGURE 1 and of reducing the radial play of these baffles that this last arrangement allows the escape flow to be limited to smaller values than the arrangement according to FIGURES 3 and 4, this escape flow being otherwise substantially constant and independent of the feed pressure which prevails in the conduits 12.

I claim:

1. A fluid thrust bearing for a revolving shaft comprising: a fixed housing having a wall thereof forming a fixed thrust member of said bearing; a shaft mounted for axial and rotary movement in said housing; a piston forming a movable thrust member of said bearing fixedly secured to said shaft for movement therewith, said piston having one end wall thereof facing said wall of said housing and forming therewith the fluid pressure chamber of said fluid thrust bearing; means for conducting fluid under pressure to said chamber for supporting said piston; means responsive to axial movement of said piston for controlling the flow of said fluid through said conducting means; and means for discharging said fluid from said chamber at a controlled rate of flow.

2. A fluid thrust bearing as defined in claim 1 in which the flow of said fluid from said chamber through said discharge means is controlled in response to axial movement of said piston; the axial movement of said piston in one direction restricting the flow of said fluid through said conducting means to said chamber and permitting an increase in the flow of said fluid from said chamber through said discharge means.

3. A fluid thrust bearing as defined in claim 2 in which said discharge means includes annular labyrinth seal means surrounding said chamber and extending co-axial with said shaft between said one end wall of said piston and said wall of said housing, one portion of said labyrinth seal being integral with said piston and the other portion of said seal being integral with said wall of said housing.

4. A fluid thrust bearing as defined in claim 1 in which said means conducting fluid to said chamber includes a fluid outlet port carried by said housing; and said means controlling the flow of said fluid through said conducting means includes a member movable axially with said piston, said member cooperating with said port for varying the flow of said fluid through said outlet port.

5. A fluid thrust bearing for a revolving shaft comprising: a fixed housing having one wall thereof forming a fixed thrust member of said bearing; a shaft mounted for axial and rotary movement in said housing; a piston forming a movable thrust member of said bearing fixedly secured to said shaft for movement therewith, said piston having one end wall thereof facing said one wall of said housing and forming therewith the fluid pressure chamber of said fluid thrust bearing; said housing having a second wall facing in the opposite direction from said first wall; said housing being formed with fluid passageway means therein terminating in a fluid outlet port in said second wall; a fluid flow control member mounted on said shaft for axial movement therewith disposed adjacent said outlet port in opposed relation thereto for cooperation therewith to vary the flow of fluid through said outlet port; means for conducting fluid under pressure from said outlet port to said chamber for supporting said piston, axial movement of said member varying the flow of said fluid through said outlet port to said chamber; and means for discharging said fluid from said chamber at a controlled rate of flow.

6. A fluid thrust bearing as defined in claim 5 in which said passageway means is restricted by throttle valve diaphragm means disposed therein upstream from said outlet port.

References Cited in the file of this patent

UNITED STATES PATENTS

| | | |
|---|---|---|
| 115,365 | Shaw | May 30, 1871 |
| 1,520,356 | Lawaczeck | Dec. 23, 1924 |